April 21, 1931.    F. D. F. BRAND    1,801,303
SWITCH
Filed June 22, 1928
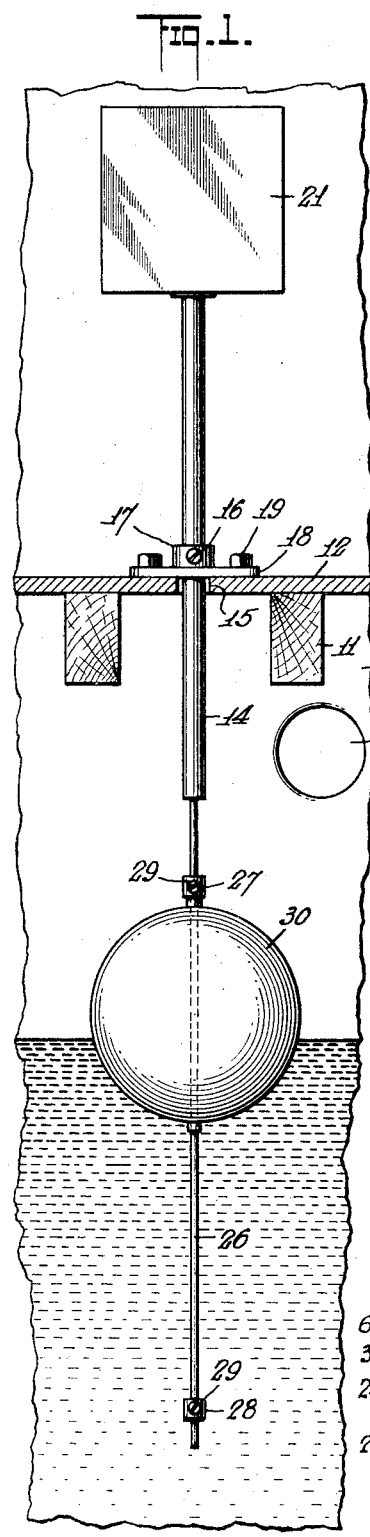
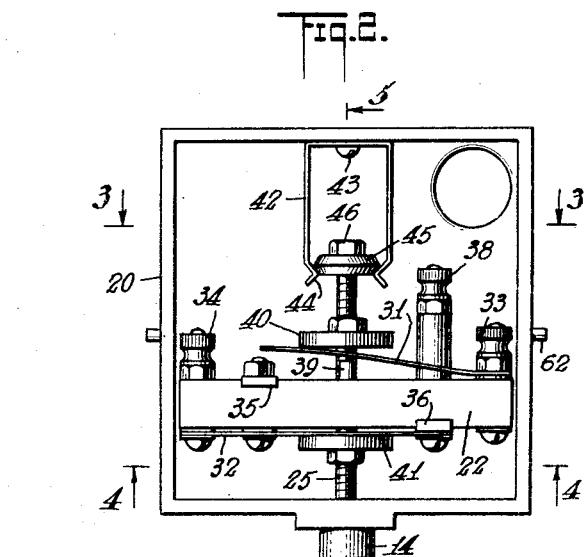
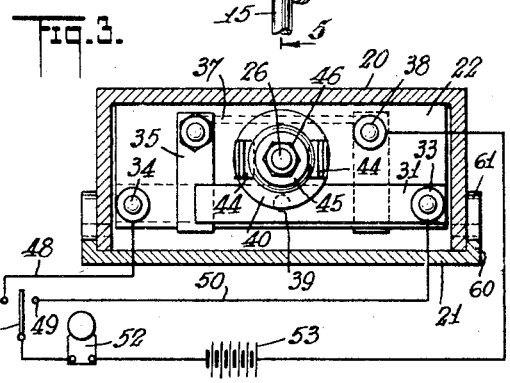
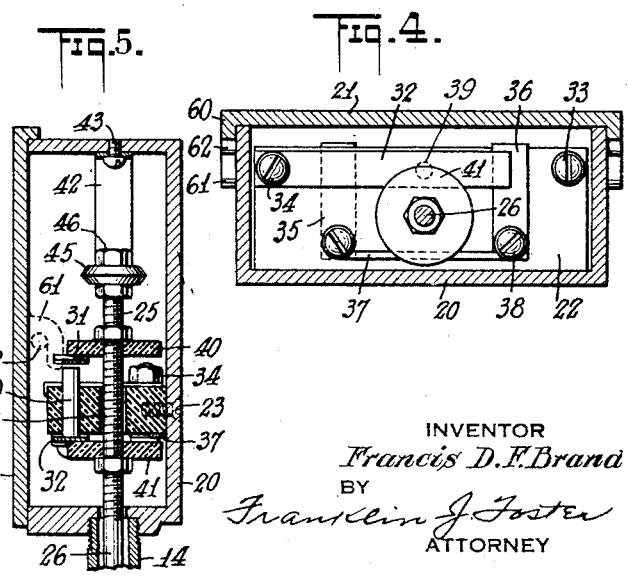
INVENTOR
Francis D. F. Brand
BY
Franklin J. Foster
ATTORNEY Patented Apr. 21, 1931

1,801,303

UNITED STATES PATENT OFFICE

FRANCIS D. F. BRAND, OF HEMPSTEAD, NEW YORK

SWITCH

Application filed June 22, 1928. Serial No. 287,620.

The device of the present invention may have a wide range of utility but finds its preferred embodiment in a float controlled telltale switch for indicating high and low water levels in a gravity tank.

A primary object of the invention is to provide a switch of this character having no neutral position so that when it is employed in a testing circuit some reading will always be obtained. In other words the switch is so designed that when a low water level has been reached, the switch will always give a low water reading up until the time that the water in the tank has reached a high level. In a similar manner the switch will continue to show high level until the water in the tank has been reduced to the point where the switch is again operative to signal low level. By virtue of this arrangement the testing signal circuit will never be dead, except where the electrical apparatus itself has developed a defect and a reading is always obtainable.

Another object of the invention is to provide a double acting telltale switch of this character, so constructed that it will be entirely positive in operation and the movement of one switch arm to signal operating position will always result in movement of the other switch arm to an inoperative position.

Still another object of the invention is to provide a novel type of switchbox embodying a removable cover which avoids the use of securing screws or the like and which may be readily dislodged for the purpose of inspecting the switch.

In a preferred embodiment of the invention a float rod is slidably mounted in an insulating block carrying spring switch arms and associated contact mechanism at opposite sides. Preferably by the simple expedient of a pusher pin working through the block, the movement of one switch arm to circuit closing position automatically positively moves the other arm out of circuit closing position. The switch arms are actuated by disks on the float rod. The rod actuating float member is slidable on the lower end of the float rod between spaced stops. The upward thrust of the float against the upper stop lifts the float rod upwardly through the block and swings the high level switch arm against its contact. A feature of the invention is the provision of means for releasably engaging the float rod as it is thus thrust upwardly and sustaining the weight of the float rod as the float again drops away from the upper stop. When, however, the water level has been lowered to a point where the weight of the float is transferred to the lower stop, the float rod holding means becomes inoperative to support the added weight of the float, and the switch actuating float rod snaps downwardly to swing the high level switch arm off its contact and move the low level switch arm onto its contact.

With the above noted and other objects in view, the invention consists in certain novel features of construction and combinations and arrangements of parts which will be more fully hereinafter described and pointed out in the claims.

The invention may be more fully understood from the following description in connection with the accompanying drawings wherein:—

Fig. 1 is a side elevational view showing the manner of installing the switch box and associated float mechanism in a gravity tank.

Fig. 2 is an enlarged front elevational view of the switch box with the cover removed to expose the switch mechanism.

Fig. 3 is a transverse sectional view on the line 3—3 of Fig. 2 and also illustrating the wiring diagram of the switch.

Fig. 4 is a transverse sectional view on the line 4—4 of Fig. 2.

Fig. 5 is a vertical sectional view on the line 5—5 of Fig. 2.

In the drawings I have used the reference numeral 10 to designate a gravity tank, near the upper end of which cross beams 11 support the usual platform 12. The overflow outlet from the tank is shown at 13.

A sleeve member 14 is disposed vertically in an opening 15 in the platform 12, this sleeve having fixed thereto, as by set screw 16, a collar 17 integral with a plate portion 18 which may be bolted, screwed, or otherwise secured as at 19 to the platform. Mounted on the upper end of the sleeve 14 is a switch box 20 having a removable front plate or cover member 21. A block of insulating material 22 is secured within the switch box as by a screw 23.

Block 22 is provided with a vertical opening 24 therein through which the threaded upper end 25 of a float rod 26 is freely movable. This float rod is guided for vertical movement in the sleeve 14 and the projecting lower end of the rod carries a pair of spaced stop members. The upper stop member 27 and the lower stop member 28 may conveniently comprise collars adjustably fixed to the float rod by screws 29. A float 30 of substantially conventional type encircles the float rod 26 and is slidable freely thereon between the stop members 27 and 28.

As the float is moved against the upper stop member by the rising water in the tank, it will exert an upward thrust on the float rod. As the subsiding water in the tank transfers the weight of the float to the lower stop member 28, the float will exert a downward thrust on the float rod.

A pair of spring switch arms 31 and 32 are mounted respectively, at the upper and lower faces of the block 22. These switch arms are each anchored at one end by terminals such as the binding posts 33, 34 respectively. The free ends of the switch arms 31, 32 are engageable with contact members such as the conductive strips 35, 36 which are electrically connected in any suitable manner as by the wire 37 and associated means to a common terminal member 38.

An insulating pin 39 is slidable vertically through the block 22. This pin serves as a pusher actuated by the movement of one switch arm toward circuit closing position to move the other switch arm out of circuit closing position. The means for actuating the switch arms from the float rod may conveniently comprise washers 40, 41 of insulating material fixed to the threaded upper end of the float rod at opposite sides of the block 22.

An inverted U shaped spring clip 42 secured as at 43 to the top of the switch box includes depending leg portions, the extremities of which are formed as inwardly turned V shaped detents 44 adapted to releasably engage a doubly bevelled disk 45 secured on the upper end of the float rod by a nut 46.

The circuit illustrated in Fig. 3 is merely a diagrammatic showing of a very simple testing circuit for a high and low level telltale switch and may of course be considerably complicated and refined to suit the requirements of various switch installations. As shown a double pole single throw testing switch includes a terminal 47 connected by conductor 48 to the terminal 34 and a terminal 49 connected by lead wire 50 to the terminal 33. The movable member 51 of the testing switch is connected through a signal 52 and source of current 53 to the terminal 38 of the telltale switch.

The operation of the device is as follows:

With the parts in the position illustrated a high water level has been reached and the float 30 has thrust the float rod 25 upwardly to a position where the disk 41 has swung the switch arm 32 against its contact 34. Switch arm 31 has been lifted off its contact 35 by the pusher pin 39 and the disk 45 has moved upwardly and been releasably engaged by the detents 44. With the parts in this position, if the testing switch arm 51 is thrown on the contact 49 a circuit will be completed through the signal 52 showing a high water condition in the tank. If the arm 51 is thrown onto the terminal 47 no signal will be sounded since the circuit is open at 31, 35.

As the water level in the tank is gradually reduced and the float slides down the float rod there will be no change in the condition of the float controlled switch and operation of the testing switch will still show a high level condition until such time as the water level has been sufficiently reduced to transfer the weight of the float 30 to the lower stop member 28. At this time detents 44 are inoperative to support the additional weight of the float and the float rod will drop gravitationally reversing the position of the switch arms.

Here again as the water level rises, no change in the condition of the float controlled switch will occur until the upward thrust of the float on the upper stop member 27 has again lifted the float rod to the position shown in the drawings.

By virtue of the arrangement described above there is no neutral position of the telltale switch, and a satisfactory test may always be had. If the switch arm 51 fails to sound a signal in either position, the operator will know that the electrical system itself is defective and requires attention.

Whether the switch arm 51 is left in the neutral position of Fig. 3 or left on the open circulated terminal of the testing switch is entirely a matter of choice. In other words this switch may be used either for testing or for the automatic signaling of high and low water level conditions.

Bearing in mind the difficult conditions under which switches of this type are sometimes inspected the novel type of switch box cover which I have here shown is of great practical importance. This cover 21 constitutes the front face of the switch box. The sides of the cover are flanged as at 60 to slidably embrace the box and the flanges are provided with hook shaped extensions 61 adapted to engage laterally projecting studs 62 on the switch box to limit the downward sliding movement of the cover. Thus the removable cover is devoid of attaching screws, and a workman, even in extremely cold weather may conveniently knock this cover upwardly and dislodge it, even though his hands are too cold to operate screw drivers or other special cover removing equipment.

It is of course to be understood that the particular electrical circuit illustrated is not in itself my invention, that the wiring arrangement is subject to many variations, and that whether the signals are energized by opening or closing the signal circuits is entirely a matter of choice.

It will thus be seen that there is herein described a device in which the several features of this invention are embodied, and which device in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a switch, a block of insulating material, a pair of spring switch arms disposed at opposite sides of the block, terminals on the block with respect to which said arms are movable and with which they are adapted to contact, and a pusher pin freely slidable through the block having its ends unattached to but engageable with the arms whereby movement of one switch arm toward the block positively pushes the other arm away from the block.

2. In a switch a block of insulating material, a pair of switch arms at opposite sides of the block normally tending to spring out of switch closing position, an actuating member slidable through the block and means carried thereby for depressing the respective switch arms.

3. In a switch a block of insulating material a pair of switch arms at opposite sides of the block normally tending to spring out of switch closing position, an actuating member slidable through the block and means carried thereby for depressing the respective switch arms, and a pusher slidable in the block, the ends of which are engaged by the switch arms to compel simultaneous movement of the latter.

Signed at Hempstead, L. I., in the county of Nassau and State of New York, this 16th day of June, A. D. 1928.

FRANCIS D. F. BRAND.